United States Patent
Hummel et al.

(10) Patent No.: US 11,473,749 B2
(45) Date of Patent: Oct. 18, 2022

(54) METHOD AND SYSTEM FOR AVOIDING PIXELS ERRORS IN HIGH-DEFINITION HEADLAMPS

(71) Applicant: Dr. Ing. h.c. F. Porsche Aktiengesellschaft, Stuttgart (DE)

(72) Inventors: Benjamin Hummel, Tamm (DE); Dominik Walter, Leinfelden-Echterdingen (DE); Maximilian Bossler, Leonberg (DE); Peter Heimpel, Tiefenbronn/Muehlhausen (DE); Robert Haehle, Stuttgart (DE); Johannes Grabowski, Stuttgart (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 0 days.

(21) Appl. No.: 17/668,972

(22) Filed: Feb. 10, 2022

(65) Prior Publication Data
US 2022/0268416 A1    Aug. 25, 2022

(30) Foreign Application Priority Data

Feb. 25, 2021   (DE) .................. 10 2021 104 518.5

(51) Int. Cl.
*F21S 41/663*   (2018.01)
*F21S 41/153*   (2018.01)
*G09G 3/32*     (2016.01)

(52) U.S. Cl.
CPC .......... *F21S 41/663* (2018.01); *F21S 41/153* (2018.01); *G09G 3/32* (2013.01)

(58) Field of Classification Search
CPC ........ F21S 41/663; F21S 41/153; B60Q 1/085
See application file for complete search history.

(56) References Cited

U.S. PATENT DOCUMENTS

| | | | |
|---|---|---|---|
| 7,292,024 B2 | 11/2007 | Zhang et al. | |
| 10,902,820 B2 | 1/2021 | Peng et al. | |
| 2007/0081739 A1 | 4/2007 | Wilbrink et al. | |
| 2009/0135279 A1 | 5/2009 | Yao | |
| (Continued) | | | |

OTHER PUBLICATIONS

German Search Report dated Jul. 20, 2021.

*Primary Examiner* — Eric T Eide
(74) *Attorney, Agent, or Firm* — Gerald E. Hespos; Michael J. Porco

(57) ABSTRACT

A high-definition vehicular headlamp has a light module configured to produce a matrix of light-emitting points each of which has a coordinate pair. The headlamp generates a light image in front of the vehicle, and the light image is divided into a matrix of pixels that correspond respectively to the light-emitting points of the light module. A specified partial image content is generated in a partial region of the light image. The partial image content acts upon a set of coordinate pairs of light-emitting points, including coordinate pairs having defective light-emitting points that could cause pixel errors. A displacement vector is formed by comparing coordinate pairs of defective light-emitting points with the set of coordinate pairs of the light-emitting points on which the partial image content acts, and the partial image content is reproduced in the partial region of the light image that has been displaced by the displacement vector.

9 Claims, 2 Drawing Sheets

(56) References Cited

U.S. PATENT DOCUMENTS

| | | | |
|---|---|---|---|
| 2014/0009938 A1* | 1/2014 | Hossfeld | F21S 41/663 |
| | | | 362/244 |
| 2016/0131579 A1* | 5/2016 | Sekiguchi | G01N 21/94 |
| | | | 250/201.1 |
| 2019/0009706 A1* | 1/2019 | Gocke | H04N 9/3141 |
| 2020/0240607 A1 | 7/2020 | Ehlert et al. | |

* cited by examiner

METHOD AND SYSTEM FOR AVOIDING PIXELS ERRORS IN HIGH-DEFINITION HEADLAMPS

CROSS REFERENCE TO RELATED APPLICATION

This application claims priority under 35 USC 119 to German Patent Appl. No. 10 2021 104 518.5 filed on Feb. 25, 2021, the entire disclosure of which is incorporated herein by reference.

BACKGROUND

Field of the Invention

The invention relates to a method and system for avoiding pixel errors in high-definition headlamps, the aim of which is a best possible display of a partial image in a light image.

Related Art

High-definition (HD) headlamps of a vehicle generate light images that present, for example, a low beam or a high beam, in an area in front of the vehicle. An HD headlamp typically has a multiplicity of light-emitting points, for example LEDs, arranged on a matrix display and are referred to as HD matrix headlamps. An imaged presentation of each light-emitting point of the HD matrix headlamp into the area in front of the vehicle corresponds to a pixel in the light image.

In addition to purely illuminating an area in front of the vehicle, with suitable control, HD headlamps can also be used for presenting additional information. For example, symbols and other information that support a driver and relate to controlling the vehicle can be projected into the area in front of the vehicle. HD matrix headlamps also can project an image sequence or animation that has a recall value and accompanies a specific operation. The image sequence may be presented by a scenario that has taken place for the start-up of the vehicle.

In these projections, pixel errors caused by defective or incorrectly functioning LEDs may have a disruptive effect for a viewer. Thus, under certain circumstances, output information, for example an alert or a warning symbol, is no longer decipherable by the driver.

US 2007/0081739 A1 teaches shifting an image from an area of a display that has defective pixels into a region of the display that has no defective pixels. For this purpose, the image content to be presented is scaled suitably to be able to be displayed in the region without defective pixels. If all regions for presenting an image content have defective pixels than an alternate image that is capable of being presented may be may be selected.

US 2020/0240607 A1 discloses a system that detects a defect of at least one pixel of a light distribution during operation of an illumination apparatus for a motor vehicle, and then reduces the light distribution in terms of their brightness to pixels adjacent to the at least one defective pixel. Hard gradients can be avoided by using soft transitions in brightness as the distance of the pixels to the at least one defective pixel grows.

U.S. Pat. No. 7,292,024 discloses alleviating a defect in a display table by imaging defects on the display table into a dataset that is assigned to the table. Using the values of the dataset, different correction models are used to modify an image displayed by pixels surrounding the respective defect.

An object of the invention to provide a method for avoiding pixel errors in high-definition headlamps wherein a projection of image contents in the light image has as few pixel errors as possible. Any controlling of the light point matrix should be capable of avoiding or reducing the pixel errors depending on the image content to be presented. A system also is provided for practicing the method.

SUMMARY

A method is provided for avoiding pixel errors in high-definition headlamps of a vehicle that has at least one headlamp and a headlamp control device. The at least one headlamp has at least one high-definition light module with a matrix of light-emitting points. Each light-emitting point is allocated one coordinate pair. The at least one headlamp generates a light image in an area in front of the vehicle. The light image is divided into a matrix of pixels. Each light-emitting point of the at least one high-definition light module corresponds to a pixel of the light image. A specified partial image content is generated in a partial region of the light image. The partial image content acts upon a set of coordinate pairs of light-emitting points. In an initialization step, a set of coordinate pairs having defective light-emitting points that cause pixel errors is allocated to the at least one high-definition light module. A displacement vector is formed by a comparison of the set of coordinate pairs of defective light-emitting points with the set of coordinate pairs of the light-emitting points on which the partial image content acts. The displacement vector may be determined by a specified function. The partial image content is reproduced in the partial region of the light image that has been displaced in accordance with the displacement vector.

The initialization step can be carried out, for example, by a producer of the high-definition light module. To this end, the set of coordinate pairs with the defective light-emitting points is stored either in a memory arranged at the high-definition light module or is provided in an external memory together with the high-definition light module. It is also possible that the initialization step is carried out by a manufacturer of the headlamp in which the high-definition light module is installed. The manufacturer can ascertain the set of defective light-emitting points themselves, or can use the external memory that is delivered by the producer of the high-definition light module to store the coordinate pairs of defective light-emitting points for example in a memory of the headlamp control device. The set of coordinate pairs of defective light-emitting points would then be transmitted to the high-definition light module from the memory of the headlamp control device.

In one embodiment of the method, an intersection or coincident alignment of light-emitting points on which the partial image content acts and defective light-emitting points is formed by the specified function or fewest points of coincident alignment. The displacement vector advantageously is formed for a smallest intersection or overlap. For example, the partial image content may be displaced step by step within the matrix of light-emitting points by in each case an extent of the light-emitting point. Thus, all possible positions of the partial image content within the matrix of light-emitting points are tested for a respective intersection with or overlap with defective light-emitting points without going beyond the boundaries of the matrix. The partial image content initially may be displaced by the displacement vector that is required to move the partial image content away from the defective light-emitting points and to then form the intersection again.

The partial region may be selected from one of the following segments in the light image before the displacement vector is formed: in the low beam, in the region of a light-dark cutoff, below a low-beam increase. In the previously mentioned segments of the light image, pixel errors are particularly noticeable and disruptive. Using the method of the invention, the partial image content advantageously is displaced into a partial region of the light image having as few pixel errors as possible.

The specified partial image content may be an animation. The animation may be provided by a vehicle control device. The vehicle control device transmits the animation, for example a video, to the headlamp control device, which reproduces the animation, displaced by the displacement vector according to the invention in the light image to a region that is free from pixel errors and without the vehicle control device being acted upon directly via the at least one headlamp.

The partial image content can be displaced into a partial region of the light image that has a zone that is free from pixel errors or includes a subset of coordinate pairs that is free from coordinate pairs of defective light-emitting points (corresponding to pixel errors).

The comparison with a partial image content is formed for a selection of still images of the animation and/or a superposition formed via the selection of still images of the animation. Combinations of different still images of the animation can also be used in this case. If appropriate, the still images in which pixel errors would be particularly disruptive since they take up, for example, a relatively large timeframe in the animation preferably are selected. However, it is also conceivable that a specified test image is used for ascertaining purposes. The specified test image can be selected for example as a superposition of all still images occurring in the animation. The test image can also act on further segments of the light image in which pixel errors are very noticeable, for example in a joint area of two main headlamps. In addition, it is possible to assign the pixel errors according to light-emitting points for projection or light-emitting points for pure illumination.

The values of the displacement vector may be stored directly on a printed circuit board that also has the high-definition light module. In this way, further control devices, such as a vehicle control device, are not acted upon or encumbered with the displacement of the partial image content during the projection using the at least one headlamp.

The set of coordinate pairs having defective light-emitting points is updated upon a self-diagnosis of the high-definition light module and the initialization step is repeated. The self-diagnosis can take place during a repair of the headlamp in a garage, during which parts relating to the high-definition light module are replaced.

The invention also relates to a system for avoiding pixel errors in high-definition headlamps in a vehicle that comprises a vehicle control device, at least one headlamp, and a headlamp control device. The at least one headlamp has at least one high-definition light module with a matrix of light-emitting points, and each light-emitting point is allocated one coordinate pair. The at least one headlamp is designed to generate, in the area in front of the vehicle, a light image that is divided into a matrix of pixels. A respective light-emitting point of the at least one high-definition light module corresponds to a respective pixel of the light image. The at least one headlamp is designed to generate a partial image content provided by the vehicle control device in a partial region of the light image. The partial image content acts upon a set of coordinate pairs of light-emitting points. In an initialization step, a set of coordinate pairs having defective light-emitting points causing the pixel errors is allocated to the at least one high-definition light module. The system is configured to form a displacement vector by a comparison of the set of coordinate pairs of defective light-emitting points with the set of coordinate pairs of the light-emitting points on which the partial image content acts. The displacement vector may be determined by a specified function. The system reproduces the partial image content in the partial region of the light image that has been displaced by the displacement vector.

In one configuration of the system, an intersection or overlap of light-emitting points on which the partial image content acts and defective light-emitting points is formed by the specified function. The displacement vector is formed for a smallest intersection.

In a further configuration, the partial region is selected from one of the following segments in the light image before the displacement vector is formed: in the low beam, in the region of a light-dark cutoff, below a low-beam increase.

The specified partial image content may be formed by an animation.

The comparison with the partial image content may be formed for a selection of still images of the animation and/or a superposition formed via the selection of still images of the animation.

In a further configuration of the system, the values of the displacement vector are stored directly on a printed circuit board that also has the high-definition light module. It is also conceivable in the case of a specified animation (which will not change again after the headlamp installation) to arrange for a producer of the printed circuit board to store the values in an EEPROM, that is to say on an electrically erasable programmable read-only memory, which is typically present in the case of a printed circuit board of this type.

The high-definition light module may be configured to perform a self-diagnosis and to update the set of coordinate pairs having defective light-emitting points. The headlamp control device may initiate the initialization step.

The set of defective light-emitting points may be stored in the headlamp control device or on the printed circuit board having the high-definition light module.

In a different configuration of the system, the high-definition light module having the matrix of light-emitting points may be an LED display.

Further advantages and refinements of the invention will emerge from the description and from the appended drawings.

It is understood that the features mentioned above and those discussed below may be used not only in the respectively specified combination but also in other combinations or individually without departing from the scope of the invention.

DETAILED DESCRIPTION

Figure 1:
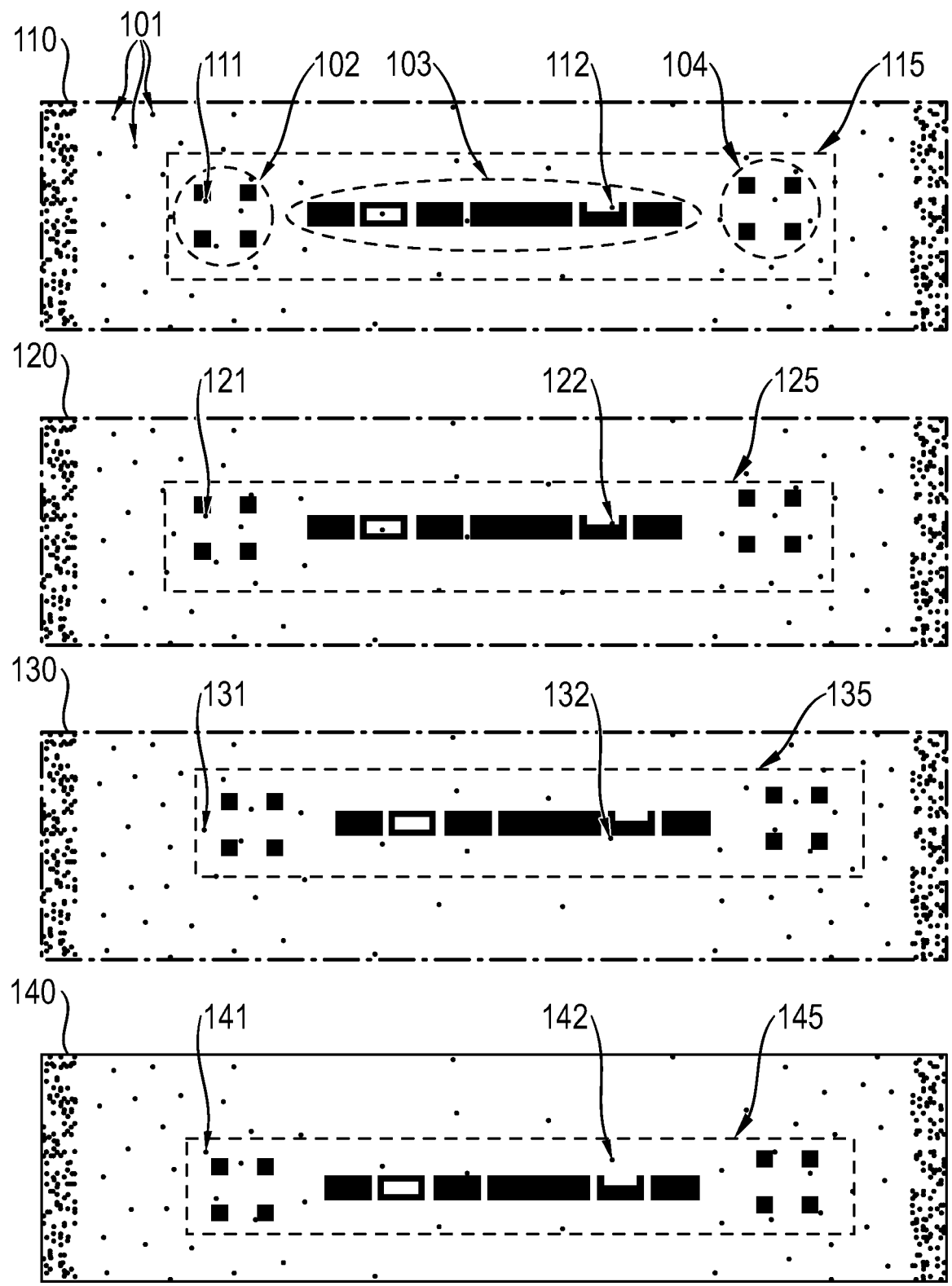
FIG. 1 schematically shows light images with a respectively arranged partial image content in one embodiment of the method OF the invention.

FIG. 1 schematically shows a plurality of light images 110, 120, 130, 140 with a respectively arranged partial image content 115, 125, 135, 145, for example an animation or a still image of the animation, in one embodiment of the method. All four light images 110, 120, 130, 140 have an equal distribution of pixel errors 101, 111, 112, 121, 122, 131, 332, 141, 142. In a first light image 110, on a partial image content 115 having three image elements 102, 103, 104, a first pixel error 111 is located within the first image element 102. A second pixel error 112 lies just above a symbol group of a central image element 103. The second light image 120 shows a partial image content 125 that has been displaced upward by an individual pixel compared to the partial image content 115 of the first light image 110 by means of the method according to the invention and whose left image element now lies just above the pixel error 121 and with the pixel error 122 not yet covering the central image element. The problem of a pixel error inside the animation was thus easily solved by a displacement according to the invention upward by the individual pixel. A third light image 130 and a fourth light image 140 also show embodiments of the method according to the invention. The third light image 130 shows a partial image content 135 that has been displaced upwardly by five pixels and to the right by eight pixels compared to the partial image content 115 of the first light image 110 and that likewise does not come to lie on the pixel errors 131 and 132, let alone on other pixel errors present in the light image 130. Similarly, the fourth light image 140 shows a partial image content 145 that has been displaced down by six pixels and to the right by five pixels compared to the partial image content 115 of the first light image 110 and that likewise does not come to lie on the pixel errors 141 and 142, let alone on other pixel errors present in the light image 140.

Figure 2:
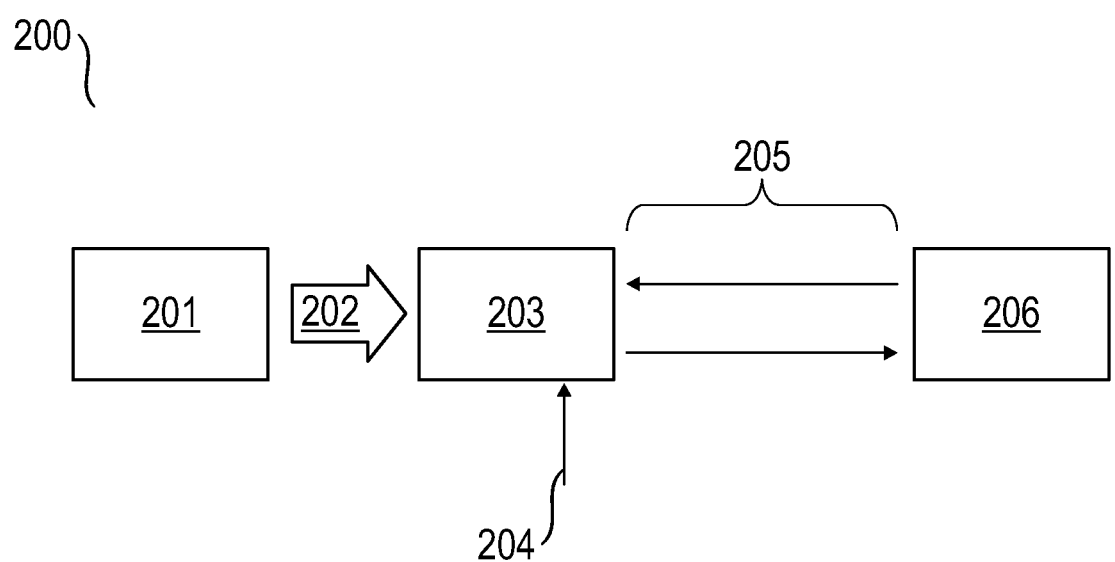
FIG. 2 Is a flowchart relating to the embodiment of the method.

FIG. 2 is a flowchart 200 relating to the embodiment of the method according to the invention. A vehicle control device 201 provides for the partial image content an animation video 202 that is transmitted to a headlamp control device 203. Values of a two-dimensional displacement vector 204 are transmitted 205 between the headlamp control device 203 and a printed circuit board 206 that is arranged in a high-definition headlamp and comprises a display having a multiplicity of light-emitting points or LEDs. This transmission 205 is performed to ascertain the displacement vector of the invention for a presentation of the partial image content without pixel errors (or with as few pixel errors as possible) and to store the values of the ascertained displacement vector 204. These values of the ascertained displacement vector 204 are an input for the headlamp control device 203 for reproducing the partial image content or the animation video 202 on the display, displaced by the displacement vector.

LIST OF REFERENCE SIGNS

101 Pixel error
102 Left image element
103 Central image element
104 Right image element
110 Light image with still image of the animation
111 First pixel error
112 Second pixel error
115 Animation
120 Animation displaced upwardly by 1 pixel
121 First pixel error
122 Second pixel error
125 Animation
130 Animation displaced upwardly by 5 pixels and to the right by 8 pixels
131 First pixel error
132 Second pixel error
135 Animation
140 Animation displaced downwardly by 6 pixels and to the right by 5 pixels
141 First pixel error
142 Second pixel error
145 Animation
200 Flowchart
201 Vehicle control device with animation video
202 Video
203 Headlamp control device
204 Values of the displacement vector
205 Transmission of displacement value
206 Printed circuit board with LED plus memory

The invention claimed is:

1. A method for avoiding pixel errors (101, 111, 112, 121, 122, 131, 132, 141, 142) in a high-definition headlamp of a vehicle, the high-definition headlamp having a headlamp control device (203) and at least two high-definition light module having a matrix of light-emitting points, each of the light-emitting points having a location defined by a coordinate pair, the high-definition headlamp generating a light image (110, 120, 130, 140) in an area in front of the vehicle, the light image (110, 120, 130, 140) being divided into a matrix of pixels, with each of the light-emitting points of the high-definition light module corresponding to a respective pixel of the light image so that a specified partial image content (115, 125, 135, 145) is generated in a partial region of the light image (110, 120, 130, 140) and the partial image content (115, 125, 135, 145) acting upon a set of coordinate pairs of light-emitting points, the method comprising:
an initialization step of identifying coordinate pairs of the high-definition light module that define locations of defective light-emitting points capable of causing the pixel errors (101, 111, 112, 121,122,131,132,141,142);
determining a displacement vector by comparing the set of coordinate pairs of the defective light-emitting points with the set of coordinate pairs of the light-emitting points on which the partial image content (115, 125, 135, 145) acts; and
reproducing the partial image content (115, 125, 135, 145) in the partial region of the light image (110, 120, 130, 140) that has been displaced in a direction and by an amount determined by the displacement vector (204).

2. The method of claim 1, wherein an intersection of light-emitting points on which the partial image content acts and defective light-emitting points is formed by the displacement vector so that a smallest intersection or overlap is formed.

3. The method of claim 1, further comprising storing values of the displacement vector (204) directly on a printed circuit board (206) to which the high-definition light module is mounted.

4. The method of claim 1, further comprising: periodically performing a self-diagnosis of the high-definition light module; updating the set of coordinate pairs having defective light-emitting points upon completion of the self-diagnosis of the high-definition light module; and repeating the initialization step.

5. A system for avoiding pixel errors (101, 111, 112, 121, 122, 131, 132, 141, 142) in high-definition headlamps of a vehicle that has a vehicle control device (201), at least one headlamp and a headlamp control device (203), the at least one headlamp having at least two high-definition light module with a matrix of light-emitting points, each of the light-emitting points having a location defined by a coordinate pair, the at least one headlamp being operative to generate, in an area in front of the vehicle, a light image (110, 120, 130, 140) that is divided into a matrix of pixels, each of the light-emitting points of one of the at least ~~ene~~ two high-definition light module corresponding to a respective pixel of the light image and the at least two high-definition light module generating a partial image content (115, 125, 135, 145) provided by the vehicle control device (201) in a partial region of the light image (110, 120, 130, 140), the partial image content (115, 125, 135, 145) acting upon a set of coordinate pairs of light-emitting points of the at least two high-definition light module, the system being configured to:

perform an initialization that identifies coordinate pairs having defective light-emitting points that are capable of causing the pixel errors (101, 111, 112, 121, 122, 131, 132, 141, 142);

allocate the coordinate pairs to the at least two high-definition light module;

form a displacement vector (204) by a comparison of the set of coordinate pairs of defective light-emitting points with the set of coordinate pairs of the light-emitting points on which the partial image content (115, 125, 135, 145) acts; and reproduce the partial image content (125, 135, 145) in the partial region of the light image (110, 120, 130, 140) that has been displaced by the displacement vector (204).

6. The system of claim 5, wherein an intersection of light-emitting points on which the partial image content (115, 125, 135, 145) acts and defective light-emitting points is formed by the displacement vector (204) for a minimum intersection or overlap.

7. The system of claim 5, wherein the values of the displacement vector (204) are stored directly on a printed circuit board (206) to which the high-definition light module is mounted.

8. The system of claim 5, wherein the high-definition light module is configured to perform a self-diagnosis and to update the set of coordinate pairs having defective light-emitting points, and in which the headlamp control device is configured to initiate the initialization.

9. The system of claim 5, wherein the set of defective light-emitting points is stored in the headlamp control device or on the printed circuit board (206) having the high-definition light module.

* * * * *